March 7, 1961  W. W. BARTELL ET AL  2,974,300

POTENTIOMETER

Filed April 14, 1959

Inventors:
William W. Bartell
Michael A. Ayoub
Richard W. Houghton
John Clayton, Jr.
By: Graf, Nierman & Burmeister
Attorneys

United States Patent Office 2,974,300
Patented Mar. 7, 1961

2,974,300

POTENTIOMETER

William W. Bartell, Winchester, Michael A. Ayoub, Needham, Richard W. Houghton, Littleton, and John Clayton, Jr., Maynard, Mass., assignors to Waters Manufacturing, Inc., Wayland, Mass., a corporation of Massachusetts Filed Apr. 14, 1959, Ser. No. 806,276

15 Claims. (Cl. 338—170)

This invention relates to potentiometers, and more particularly to potentiometers having a constant torque characteristic over long periods of use.

Potentiometers (it will be understood that this term as herein used includes variable resistors) commonly have a fixed resistance element along which there travels a movable tap or wiper. In the most commonly used type of potentiometer, the resistance element is in the form of an entire or partial circle, and the wiper is mounted on a rotary shaft for adjustment of the voltage division, resistance value or other quantity for which the potentiometer is employed. There are ordinarily provided end stops limiting the travel of the wiper, but such stops are frequently omitted, as where the potentiometer is designed for continuous unidirectional rotation.

Potentiometers previously available have been poorly suited for applications in which the torque required for adjustment of the potentiometer must be closely controlled, particularly where it is desirable that the required torque be substantial. In most applications of potentiometers, the exactness of control of torque is of little moment, the primary requirement merely being that the shaft be capable of being turned without excessive manual effort by the user. The achievement of this objective is attained very readily, and accordingly substantially no special provision regarding torque requirements need be, or is, made in the potentiometers employed for such simple manual operations as are involved in the adjustment of potentiometers in household devices, such as radios and television sets, and most electronic instruments of a relatively simple nature; in such cases the shaft bearing is a simple sleeve, and over-all torque requirements are disregarded as a design matter.

In more complex or refined uses of potentiometers, as where, for example, the potentiometer shaft is to be rapidly accelerated by a motor, the matter of shaft torque becomes of much greater concern. Where, for example, the potentiometer is used in a measuring instrument of the "null" type, wherein an external quantity is measured or used for control purposes by balancing the wiper position in accordance with changes in the external quantity, the degree of potentiometer shaft torque friction may become an extremely important factor in design of potentiometers for such purposes. The lower the torque required for adjusting the position of the wiper, the lower the power requirements of the servomotor or other mechanism employed to make the adjustment. To achieve the end of minimizing of torque, potentiometers of the better constructions used in instruments and control systems of this type normally employ such antifriction devices as roller bearings for the mounting of the shafts. Where such provisions are made, the torque or friction load of the shaft may be reduced substantially to the friction contact between the wiper and the fixed resistance, which may be, and usually is, held to a minimum by the employment of resilient wipers of delicate construction, thus producing minimum torque requirements in adjustment of the shaft.

Under certain conditions, however, mere reduction of torque does not produce satisfactory operation. For example, where the device incorporating a potentiometer is to be operated under conditions of continuous or intermittent vibration, the use of constructions requiring only very low torque will produce the possibility of change of the adjustment or position of the wiper due to vibration. This problem will be accentuated with continued use of the potentiometer, since continued use will tend to reduce the frictional drag of the resilient wiper due to fatigue of the material employed in the wiper and surface wear. Furthermore, it is highly undesirable that the wiper itself be relied on for control of the shaft torque, since the nature of the materials and dimensions of the wiper required for desirable noise-free electrical characteristics are in general inconsistent from a practical standpoint in production operations with employment of the wiper as a control over the torque, particularly in view of the fact that any substantial frictional engagement between the wiper and the fixed resistance must inevitably shorten the life of both the wiper and the fixed resistance (generally a very fine wire) across which it slides.

Even where it is not anticipated that factors such as vibration may be encountered, control of torque or mechanical resistance of the shaft is required for other purposes. In many applications of precision potentiometers, particularly in systems such as "null" systems employing motors for the potentiometer drive, the speed of response or "time constant" of the entire system is directly linked to the acceleration given the shaft by its drive in the starting of each adjustment operation and also to the braking effect exercised by the shaft when the motor drive is de-energized. If the torque required by the shaft is too high, the drive will be sluggish (too high a time constant for proper operation); if the torque required by the shaft is too low, the potentiometer will not present to its associated drive the torque load for which the system is designed and the time constant may well be so low as to produce "hunting" in the system due to inadequate damping of oscillations due to system inertia, of which the potentiometer shaft is in such instances an important factor. Further, in complex control equipment of even a manually operable nature, efficiency of the operator may be greatly impaired if all, or certain groups, of the manual adjustment members do not have the same "feel." Control over "feel" further presents the possibility of reduction of errors on the part of the operator in cases where controls are closely grouped, as on an instrument panel.

It will be seen from what has been said above that the potentiometers heretofore available are, for many applications, inadequate for certain purposes in one or more of a number of respects, all stemming from inadequate control or constancy of shaft torque or mechanical resistance, both as regards processes of manufacture and as regards constancy of torque as the potentiometer is used. The present invention provides a novel type of construction which offers great advantage in respect to the controllability of shaft torque in manufacturing operations and the preservation of constancy of the torque over long life-time of use. In general, the advantages mentioned are obtained by coupling to the shaft, independently of the shaft bearing and also of the wiper contact, a friction member which travels with the shaft, and providing a fixed friction member secured to the stationary housing of the potentiometer, these fixed and movable friction members being in constant frictional engagement as the shaft is rotated and providing a torque or mechanical shaft resistance which is substantially greater than those of either the shaft bearing or the wiper friction, so that the torque is not substantially affected by variations in the friction produced by these two torque-determining elements of conventional potentiometers, which can not practically be made to provide suitable torque remaining constant over long periods of use of the potentiometer.

In the most advantageous embodiments of the invention, the friction is provided by the employment of a pair of friction surfaces on the fixed or movable portion of the potentiometer, with the friction member on the other (i.e., movable or fixed) portion compressed between the two friction surfaces, so that the torque device produces no end forces on the shaft. The interface between the movable and fixed friction members is desirably substantially radially removed from the axis of rotation of the shaft in order to maximize the effect of this controlled friction source on the over-all torque of the shaft, thus again minimizing the effects of inherent changes in friction in the bearing and wiper portions of the device, and also reducing the friction required to produce reasonably high shaft operating torques and reducing the wear on the device.

In further refinement of the construction generally described above, the potentiometer construction of the invention provides externally variable control over the torque. In the present invention, there are provided means operable from the outside of the housing to vary the frictional engagement between the fixed and moving friction members. In the embodiment of the invention to be described, such variation is accomplished by altering the spacing between a pair of friction members on the fixed portion of the potentiometer between which the friction member on the movable portion is compressed. This is accomplished by adjustment of the rear wall of the housing of the potentiometer with respect to the front portion of the housing, one of the pair of fixed friction members being mounted on this rear wall and the other of the pair being in fixed relation to the front portion of the housing. The rear wall is threadedly engaged with the front portion of the housing, and tightening or loosening of this threaded engagement thus serves to increase or decrease the compression of the resilient friction member mounted on the rear end of the shaft. By permitting longitudinal sliding motion in this mounting, thrust forces on the shaft are prevented at all settings.

The advantage of this type of construction, and variants thereof, may readily be seen. With this construction, from the production standpoint, it is readily possible to produce potentiometers, in small quantities or large, meeting any required specification as to shaft torque. Because the materials of construction are free of electrical requirements, they may be selected solely for their mechanical characteristics regarding constancy of frictional engagement. Thus there may readily be made potentiometers which will hold their desired operating torque for a number of revolutions up to 100,000 or more. Furthermore, in addition to the fact that in production adjustment may be made to the desired torque, the "life-time" of the potentiometer, to the extent that it is limited by torque requirements, may readily be renewed by the user by simple adjustment of the threaded engagement mentioned. In production operations, the threaded engagement is normally "locked" by use, for example, of a dab of light cement or pipe-thread compound, but this type of locking may readily be removed by the user of the potentiometer either for purposes of renewing the life of the potentiometer when the torque has changed beyond acceptable limits for the particular purpose, or for changing the torque pre-set at the factory, in accordance with the requirements of a particular use. The adjustability provision presents further advantage in that any particular torque requirement may be fulfilled from a stock carried by the manufacturer, distributor or user without the necessity for anybody in the chain of distribution carrying on hand potentiometers of varying torque characteristics. Because of the nature of the problem which produced the solution of the invention, the full discussion and description herein is confined to potentiometers. However, the invention in its broader aspects may be applied to other variable electronic impedance components, and indeed to other types of mechanisms wherein similar problems are encountered.

For more detailed understanding of the advantage of the invention, and of the manner in which they are achieved, reference is made to the embodiment of the invention illustrated in the attached drawing in which.

Figure 1:
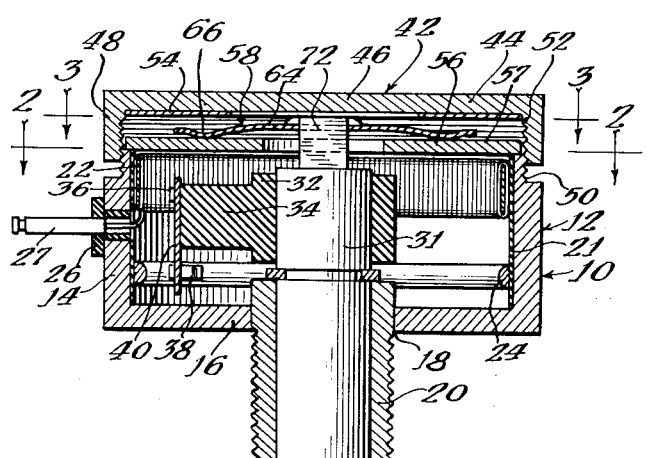
Figure 1 is a cross-sectional view of a potentiometer having a torque control embodying the present invention.

Referring now to the drawings, the potentiometer 10 therein illustrated is constructed in a usual manner in many respects, having a housing 12, which housing includes a right circular cylindrical wall 14 and a front wall 16 formed integrally with the wall 14. The front wall has a shaft bearing aperture 18 formed in the central portion thereof, and a shaft bearing 20 is fixed in said aperture, a simple sleeve bearing being employed in the illustrated embodiment.

The cylindrical wall 14 has an insulating liner 21. A conventional wire-wound resistance element 22 is mounted on the wall 14. A slip ring 24 is also mounted on the wall 14 adjacent to front wall 16. The resistance element 22 and the slip ring 24 are electrically connected in a conventional manner to an external three-post terminal assembly 25. The terminal assembly 25 includes an insulating mount 26 supporting posts 27 on wall 14.

A potentiometer shaft 30 is rotatably mounted in the bearing 20. A wiper carrier 32, which is made of an insulating material, is fixed to the inner portion 31 of the shaft. The carrier 32 includes a support arm 34 which has mounted thereon a pair of wipers 36 and 38, which electrically contact the resistance element and slip ring respectively. The wipers 36 and 38 are electrically connected to each other by a conducting bar 40 which secures the wipers to the end of arm 34. Thus far the structure described is of a conventional type of construction.

The back end of the housing is enclosed by a torque control device generally designated 42. The torque control 42 includes a rear housing cap 44 which is threadedly mounted on housing 12. The rear wall 46 of the cap serves as the rear enclosure of the potentiometer and a cylindrical sidewall 48 has internal threading 52 cooperating with external threading 50 on the sidewall of the housing. Thus wall 46 of the cap may be selectively spaced from the end of cylindrical wall 14 for purposes which will be hereinafter described.

A friction member 54, which may be a thin annular disk of nylon or similar wear-resistant material, lines the interior surface of wall 46. The friction member 54 thus provides a relatively smooth friction surface on the interior of the cap 44 which friction surface may be readily replaced should the surface wear out or should an entirely different friction characteristic be desired. A rigid friction member 56 in the form of a disk, for example of mica-filled plastic laminate, is positioned in engagement with the end of the cylindrical wall 14. Friction member 56 has a surface 57 facing friction member 54. The outside diameter of rigid friction member 56 is greater than the interior diameter of the cylindrical wall 14 but less than the interior diameter of cap wall 48, so that member 56 readily fits inside of cap 44.

Figure 4:
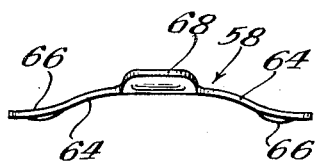
Figure 4 is a side view of a resilient friction member shown in Figure 3.
Figure 3:
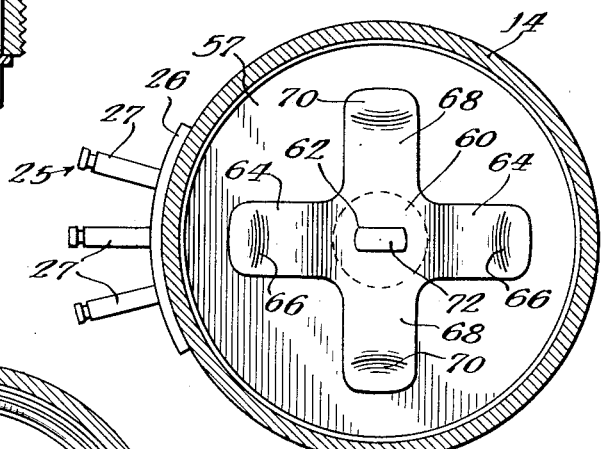
Figure 3 is a cross-sectional view of Figure 1 taken on line 3—3.
Figure 2:
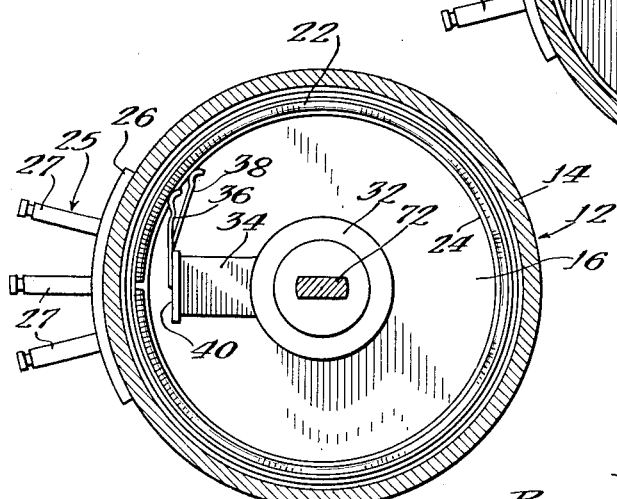
Figure 2 is a cross-sectional view of the potentiometer shown in Figure 1 and taken on line 2—2 of Figure 1.

The two friction members 54 and 56 compress a resilient friction member or slider 58, of a resilient material such as Phosphor bronze. In this instance, the resilient friction member has the general form of a cross. Resilient member 58 includes a central or mounting portion 60 which portion 60 has a rectangular aperture 62 cut in the center thereof. A first pair of opposed resilient arms 64 are formed integral with the central portion 60. Each of the arms 64 is curved downward in its natural state as may be seen in Figure 4 and has a boss 66 formed therein near the free end of the arm so that the boss engages surface 57 of rigid friction member 56. The resilient friction member 58 includes a second pair of identical arms 68 perpendicular to the arms 64. The arms 68 are also formed integral with the central portion 60 but curve upward rather than downward as do arms 64. Each of the arms 68 has a boss 70 similar to boss 66 in arms 64 and engaging the friction member 54.

The shaft 30 has a flat extension 72 formed integrally on the inner end and slideably fitting the aperture 62 in the resilient member 58.

The friction of the bearing and the wiper are negligible compared with that of the torque control device, so that the torque required to rotate the shaft 30 in order to relocate wiper 36 relative to the resistance element is determined substantially entirely by the torque control 42.

The amount of frictional resistance produced between the friction elements and the resilient element may be fixed as to range by selection of materials and surface conditions of the materials. The arrangement allows torque resistance to be varied with a fine precision without having a complex mechanism. The torque control 42 allows the torque to be set simply by spacing the two friction members 54 and 56 relative to each other. The spacing is accomplished by turning the cap 44 to move the plate 46 in and out. As the friction member 54 is brought closer to friction member 56 the resilient member 58 is compressed so that there is a greater force applied at the bosses 66 and 70, thus increasing the frictional force. Conversely, as the friction member 54 is spaced further from friction member 56 there is a lesser force applied to the bosses and a smaller frictional force results. The amount of torque required to turn the shaft 30 may be selected and the cap may be locked to the housing by the application of a dab of suitable cement (not shown).

By selection of materials in not only the frictional elements 54 and 56 but also in the resilient friction member 58, any desired range of torque may be selected. As was described above, the amount of torque required to rotate the shaft may be selectively determined and varied by simply positioning the cap 44 relative to the housing, and suitable calibration markings may be provided if desired.

It will be observed that the longitudinally slideable mounting of the friction member 58 on the shaft prevents the application of end thrust to the shaft irrespective of the torque setting. Obviously, however, where the teachings of the invention are applied to potentiometers or other impedance elements having fixed, rather than variable, torque resistance, the mounting of the movable friction member may, by suitable design, be made fixed. It will likewise be seen that although the illustrated embodiment employs a resilient friction member whose resilience is supplied by the choice of the material itself, resilience may, with only a slight sacrifice of complexity of construction, be supplied by, for example, one or more separately provided parts such as biasing springs.

It will be obvious to those skilled in the art, after careful perusal of the above description and examination of the annexed drawing, that many other changes may be made without departing from the teachings of the invention, which may be incorporated in structures substantially different in appearance and details of operation from that herein illustrated and described. Accordingly the scope of the invention shall not be deemed to be limited by the particular embodiment shown in the drawing but shall be determined by the annexed claims.

What is claimed:

1. A torque control device for use with a variable impedance element having a rotatable shaft, said torque control device including first and second rigid friction members, a resilient friction member compressed between said first and second friction members, said resilient friction member being adapted to be attached to the shaft, and a threaded adjustment member associated with the second friction member to selectively space the second friction member from the first friction member against the resilience of the resilient friction member.

2. A potentiometer having a housing with a cylindrical wall, a resistance element mounted on said housing, a wiper contact, a shaft rotatably mounted in said housing and supporting the wiper contact, an annular friction member having an outside diameter greater than the inside diameter of the cylindrical wall and resting on the end thereof, a cap movably attached to the cylindrical wall, a friction surface on the interior of the cap, and a resilient friction member longitudinally slideable on the shaft but rotationally affixed thereto, said resilient friction member having portions engaging the annular friction member and the friction surface on the cap, whereby the cap may be positioned relative to the cylindrical wall to vary the spacing between the friction surface and the annular friction member, thereby selectively compressing the resilient friction member to determine the amount of torque resquired to rotate the shaft.

3. A potentiometer having a housing with a cylindrical wall, a resistance element mounted in the housing, a wiper contact, a shaft rotatably mounted in said housing and supporting the wiper contact, an annular rigid disk abutting one end of said cylindrical wall, a resilient friction member having a pair of opposed arms bent in one direction frictionally engaging the annular disk, a second pair of opposed arms bent in a direction opposite to that of the first mentioned pair of arms, and a central portion connecting said arms and having a non-circular aperture, an extension on the end of the shaft registering with the aperture to rotate the resilient friction member with the rotation of the shaft, a second annular disk frictionally engaging the second pair of arms on said resilient friction member, and a cap threadedly mounted on said cylindrical wall and engaging said second disk, whereby the cap may be adjusted relative to the cylindrical wall to regulate the amount of torque required to rotate the shaft without exerting thrust upon the shaft.

4. A potentiometer having a housing, a resistance element mounted in said housing, a wiper contact, a shaft rotatably mounted in the housing and supporting the wiper contact, means for securing the shaft and wiper contact in fixed position in the longitudinal direction of the shaft, a friction member independent of said securing means insulated from the wiper contact and attached to the shaft for rotation with the shaft, and a friction member independent of the securing means in fixed rotational position on the housing, the friction members being in frictional engagement along a path substantially radially displaced from the axis of the shaft and at least one of the friction members being of resilient material and being constructed and arranged to be free of thrust forces on the shaft and the securing means.

5. A potentiometer having a housing with a cylindrical wall, a resistance element mounted in the housing, a wiper contact, a shaft rotatably mounted in the housing and supporting the wiper contact, a cap threadedly attached to one end of the wall, a friction member on the interior surface of the cap, and a friction member attached to the end of the shaft, the friction members being in mutual engagement and one of them being resilient, whereby the cap may be selectively positioned relative to the end of the shaft to compress the resilient friction member to vary the amount of torque required to rotate the shaft against the friction between the friction members.

6. A potentiometer having a housing with a resistance element mounted thereon, a wiper contact, a shaft rotatably mounted in the housing and supporting the wiper contact, means for securing the shaft and wiper contact in fixed position in the direction longitudinal of the shaft, a friction element independent of said securing means in fixed rotational position on the housing, a friction element independent of said securing means in fixed rotational position on the shaft and frictionally engaging the first friction member, at least one of the friction elements being resilient, and the friction elements being constructed and arranged to be free of thrust forces on the shaft and the securing means, and manually variable means for applying a load to the resilient friction member in order to vary the torque required to rotate the shaft.

7. In a potentiometer having a housing and a shaft, the improvement comprising a torque control device including a friction member mounted on the housing, a cap threadedly mounted on said housing, a second friction member between the cap and the first friction member, a resilient friction member mounted on the shaft between the friction members and in frictional engagement with both of said friction members, whereby the resilient friction member is compressed by said other friction members as the end of the cap is positioned relative to the housing thereby regulating the torque required to rotate the shaft in the housing.

8. A torque control device for use with variable impedance elements and the like, said device including a resilient member having two pairs of mutually perpendicular arms, each of said pairs of arms bent in opposite directions, friction members on opposite sides of the resilient member engaging respective pairs of said arms, and means for selectively spacing the friction members to vary the frictional resistance to relative rotation.

9. A potentiometer having fixed and movable portions, a housing enclosing such portions, one of the portions bearing a resistance element and the other bearing wiper contact slidable on the resistance element, conductive means for connecting the wiper contact to an external circuit, said wiper contact and conductive means forming the electrical assembly of the potentiometer, a rotary drive member coupled to the movable portion, means for securing the drive member in fixed longitudinal position, a pair of friction members in addition to the electrical assembly and the securing means facing each other within the housing in the direction parallel to the axis of the rotary drive member and a third friction member in addition to the electrical assembly and the securing means interposed between the pair and engaging each to form a friction assembly having a first portion compressed between members of a second portion at points substantially radially outward from the shaft, at least one of said portions being resiliently urged against the other at all points of engagement, said friction assembly portions being mounted in fixed rotational positions on the fixed portion of the potentiometer and the rotary drive member, respectively, whereby the thrust forces exerted to maintain the frictional engagement are in opposite directions on the shaft, the torque resistence of the frictional assembly being substantially greater than that of the electrical assembly and all other points of friction between the fixed and movable portion.

10. The potentiometer of claim 9 wherein at least one of the friction assembly portions is mounted for sliding motion in said direction, so that no thrust is exerted by the friction assembly.

11. The device of claim 9 having means for varying the spacing between the pair of friction members to vary the turning torque of the drive member.

12. The device of claim 10 wherein the spacing-varying means comprises a threaded member on the fixed portion of the potentiometer.

13. In a potentiometer having an enclosed housing, a resistance element within the housing, a shaft rotatably mounted in the housing and supporting the wiper contact for sliding motion on the resistance element and conductive means, partially rotatable with the shaft and partially stationary, to connect the wiper contact to an external circuit, the construction for improving the torque characteristics of the potentiometer having a friction member on the shaft extending radially from the shaft within the housing, in addition to the wiper contact and the rotatable part of the conductive means, and a friction surface on the interior of the housing in addition to the resistance element and the stationary part of the conductive means, the radially extending friction member and the friction surface being in sliding contact at a plurality of points symmetrically located with respect to the axis of the shaft and substantially radially spaced outwardly from the shaft, the torque resistance of the frictional engagement of the friction surface and friction member being substantially greater than the total torque resistance of the frictional engagement between the wiper and the resistance element and between the parts of the conductive means.

14. The improved potentiometer construction of claim 13 wherein the friction surface is on the back of the housing and the friction member comprises a resilient member having a central portion mounted on the shaft for rotation therewith, and rearwardly and outwardly extending portions having their outer ends seated for sliding rotation on the surface.

15. The improved potentiometer construction of claim 13 having the friction surface facing in a direction parallel to the axis of the shaft and having threaded means operable from the exterior of the housing to move the friction surface in the axial direction to vary the torque characteristics of the potentiometer.

References Cited in the file of this patent

UNITED STATES PATENTS

| | | |
|---|---|---|
| 1,507,021 | Miller | Sept. 2, 1924 |
| 2,069,440 | Hathorn | Feb. 2, 1937 |
| 2,691,087 | Holleran | Oct. 5, 1954 |